US007908586B1

(12) United States Patent
Blas, Jr.

(10) Patent No.: US 7,908,586 B1
(45) Date of Patent: Mar. 15, 2011

(54) COLLAPSE ON CONTENT PROPERTY

(75) Inventor: Joaquin C. Blas, Jr., Pacifica, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1244 days.

(21) Appl. No.: 11/500,023

(22) Filed: Aug. 7, 2006

(51) Int. Cl.
*G06F 9/44* (2006.01)

(52) U.S. Cl. ......... 717/113; 717/110; 717/111; 717/112

(58) Field of Classification Search ........... 717/110–113
See application file for complete search history.

(56) References Cited

U.S. PATENT DOCUMENTS

| 5,185,698 | A   |   | 2/1993  | Hesse et al.   |         |
|-----------|-----|---|---------|----------------|---------|
| 6,105,036 | A   |   | 8/2000  | Henckel        |         |
| 6,151,426 | A   |   | 11/2000 | Lee et al.     |         |
| 6,931,625 | B1  |   | 8/2005  | Coad et al.    |         |
| 7,328,426 | B2  | * | 2/2008  | Cosimo et al.  | 717/113 |
| 7,448,024 | B2  | * | 11/2008 | Breeden et al. | 717/125 |
| 2003/0131337 | A1 |   | 7/2003  | Perumainar     |         |
| 2003/0145051 | A1 |   | 7/2003  | Bates et al.   |         |
| 2003/0214538 | A1 |   | 11/2003 | Farrington et al. |      |
| 2004/0064791 | A1 |   | 4/2004  | Hattori et al. |         |
| 2004/0075699 | A1 |   | 4/2004  | Franchi et al. |         |
| 2004/0085367 | A1 |   | 5/2004  | Hagarty        |         |
| 2005/0044528 | A1 | * | 2/2005  | Olsen          | 717/109 |
| 2006/0044597 | A1 |   | 3/2006  | Dumitrescu et al. |      |
| 2007/0283291 | A1 | * | 12/2007 | Morris         | 715/804 |
| 2008/0092117 | A1 | * | 4/2008  | Cosimo et al.  | 717/111 |

OTHER PUBLICATIONS

"Code Block Highlighter", IBM Technical Disclosure Bulletin, Issue 449, dated Sep. 16, 2001.
U.S. Appl. No. 11/210,250, filed Aug. 23, 2005.
Office Action mailed Apr. 29, 2009 in U.S. Appl. No. 11/210,250.
Office Action mailed Oct. 20, 2009 in U.S. Appl. No. 11/210,250.
Advisory Action mailed Jan. 13, 2010 in U.S. Appl. No. 11/210,250.
U.S. Appl. No. 11/209,335, filed Aug. 23, 2005.
Office Action mailed Apr. 29, 2009 in U.S. Appl. No. 11/209,335.
Office Action mailed Nov. 23, 2009 in U.S. Appl. No. 11/209,335.
Office Action mailed May 26, 2010 in U.S. Appl. No. 11/209,335.
U.S. Appl. No. 11/210,270, filed Aug. 23, 2005.
Office Action mailed Jul. 10, 2008 in U.S. Appl. No. 11/210,270.
Office Action mailed Jan. 7, 2009 in U.S. Appl. No. 11/210,270.
Examiner's Answer dated Nov. 25, 2009 in U.S. Appl. No. 11/210,270.

* cited by examiner

*Primary Examiner* — Philip Wang
(74) *Attorney, Agent, or Firm* — Kilpatrick Townsend & Stockton LLP

(57) ABSTRACT

A content collapse feature is described that allows a user to designate what should be collapsed by designating a content property, such as attributes, identifications (IDs), tag classes, and the like. Input of one or more content properties come in from a user desiring to collapse various sections of content displayed in an IDE. One or more portions of the content corresponding to the content properties is identified by the IDE and then collapsed wherein the content in the collapsed portions are removed from the IDE display. The collapsed portions of content may either be replaced with a collapse indicator visible to users in the IDE display or hidden from view altogether in the IDE.

26 Claims, 7 Drawing Sheets

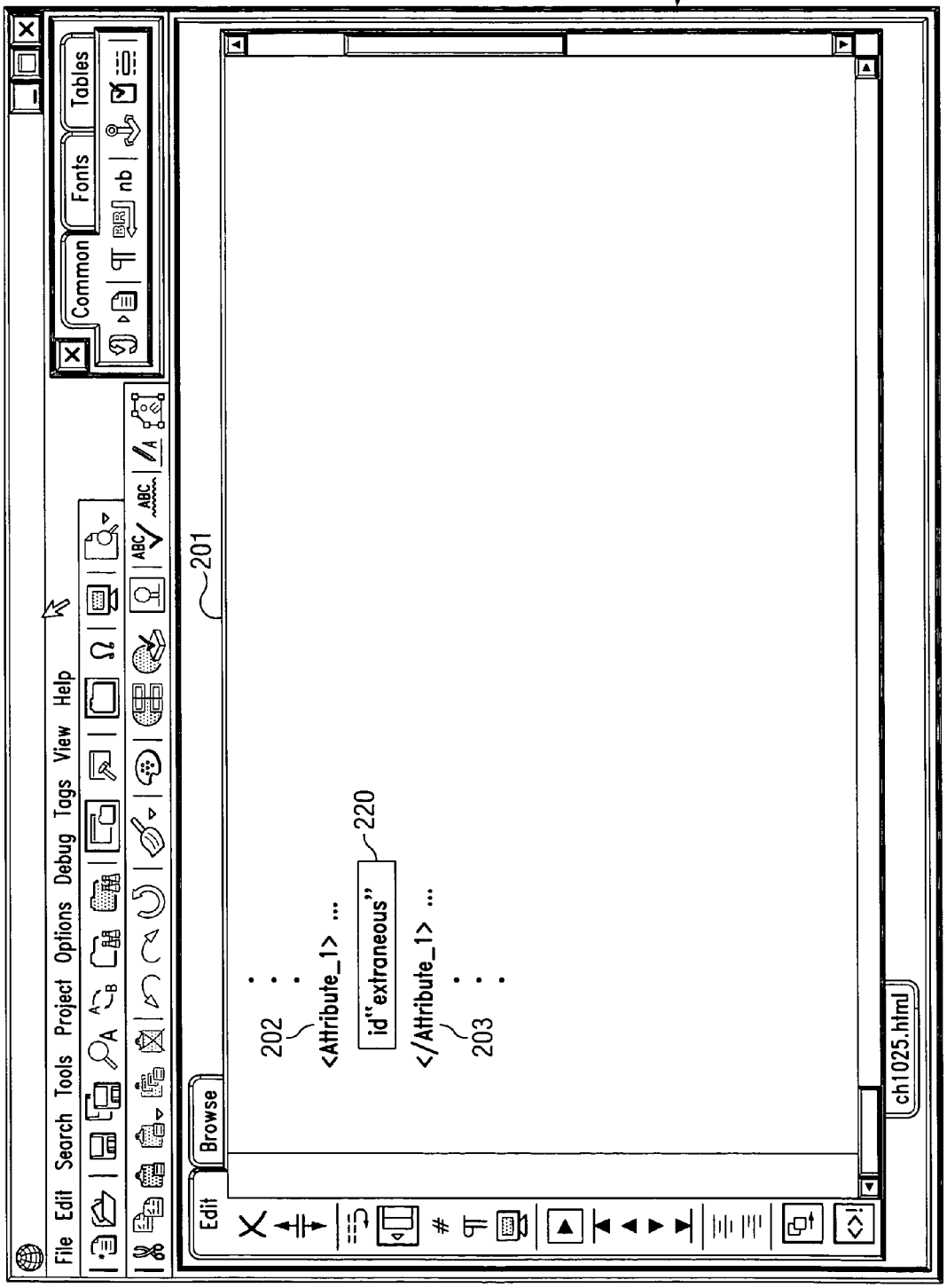

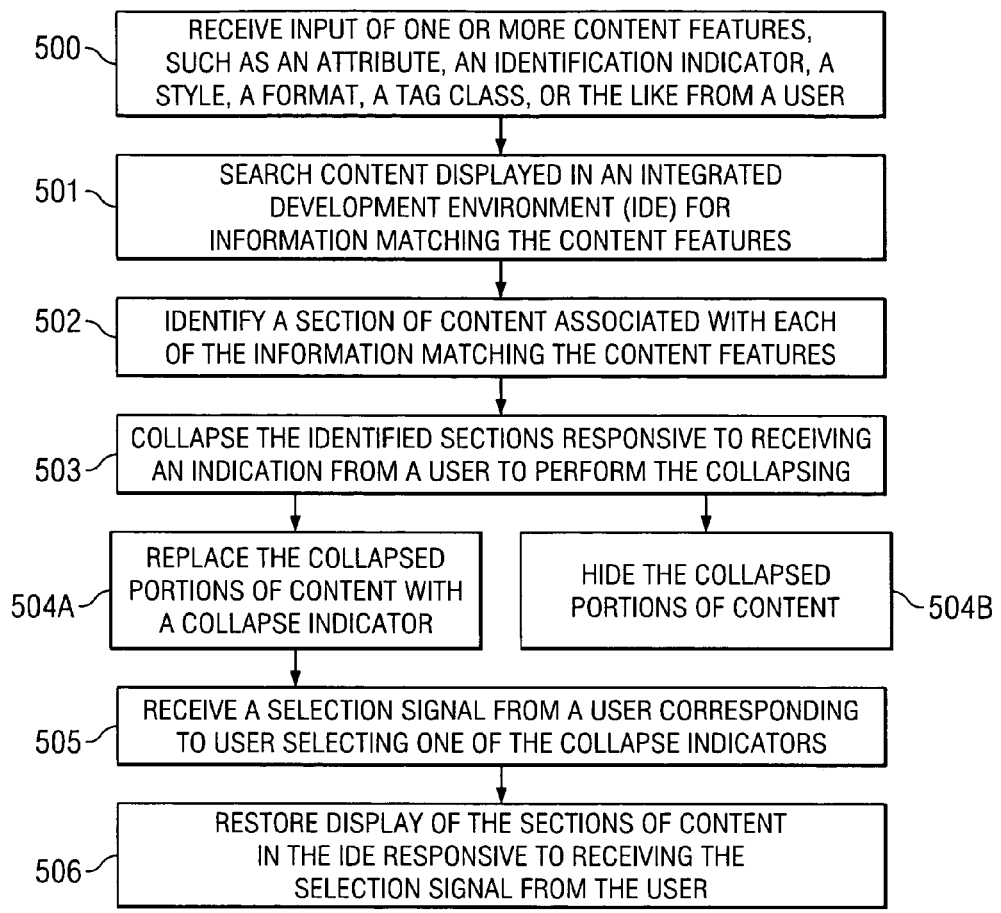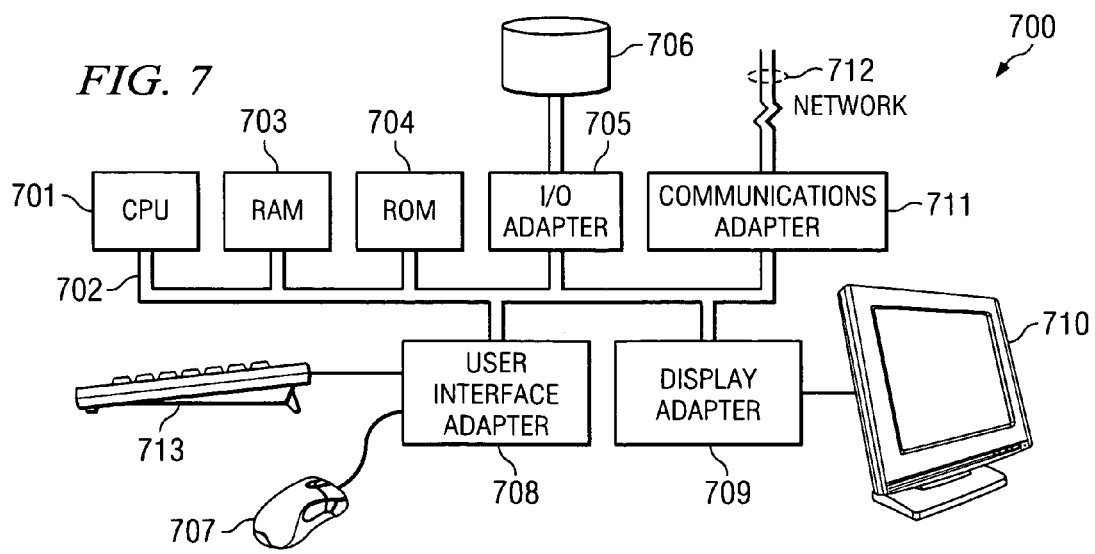

COLLAPSE ON CONTENT PROPERTY

TECHNICAL FIELD

This invention relates, in general, to content display in Integrated Development Environments (IDEs), and, more specifically, to collapsing content based on content properties.

BACKGROUND OF THE INVENTION

Integrated Development Environments (IDEs) are software tools that typically allow developers (e.g., web developers, application developers, and the like) to create web pages, websites, interactive applications, and the like that various users may access and execute via the Internet, intranets, or on a local client computer. Mulitple IDEs exist in the marketplace, such as Adobe Systems Incorporated's DREAMWEAVER®, GO LIVE®, FLASH®, FLEX-BUILDER™, Borland Software Corporation's DELPHI®, and the like. Some IDEs, such as DREAMWEAVER®, GO LIVE®, and the like, provide an application environment for web developers to design Internet documents, such as those defined in Hypertext Markup Language (HTML), Extensible Markup Language (XML), Extensible HTML (XHTML), Active Server Page (ASP), COLDFUSION® Markup Language (CFML®), and the like, in both a text-based code editor and a graphical-based design time environment.

The text-based code view presents the source code as text in a portion of the design screen and allows the developer to edit the code directly in the document file. For example, a web developer may write and edit HTML or Cascading Style Sheets (CSS) code in the code view. The design view, on the other hand, is a What You See Is What You Get (WYSIWYG) view of the final document that allows the user to visually manipulate the interpreted and graphically laid-out version of the document, such as, for example, by dragging, dropping, cutting, and pasting visual components. As the developer works, changes to the document may be reflected in both the code view and the design view.

One feature that is often supported by various IDEs is a code collapse. Code collapse is the ability to hide code or rendered content or visually replace portions of the code or rendered content in a document with a representative image or button, in effect, hiding or reducing the screen space to bring other portions of the code into more relative view of the user. Moreover, when hiding the rendered content, the user may view the rendered document without the collapsed/hidden content. Users typically employ such a feature to hide portions of the code or rendered content that they are not presently working with or to bring two or more portions of the code closer together so that scrolling is not necessary to view them at the same time. Additionally, some code collapsing features are used to hide code that may be proprietary or to hide rendered content that may be confidential or proprietary.

FIG. 1A is a screenshot illustrating IDE 100 having code view 101. Code view 101 contains three representative sections of code, Code A, Code B, and Code C. It should be understood that actual code would be in the sections marked Code A, Code B, and Code C. Code view 101 shows selection area 102 in which the user has selected Code B. In preparing to collapse a section of code, a user will typically select the particular code that he or she desires to collapse using a mouse or other such pointing device. The developer then activates the code collapse feature by making a menu selection or other such activation indicator, such as by selecting widget 103 in the gutter area of code view 101. Internally, the code defining IDE 100 notes the region of Code B by placing markers that capture the range that was selected in selection area 102.

FIG. 1B is a screenshot illustrating IDE 100 after the user selects to collapse Code B. After selecting widget 103, the text of Code B is removed from code view 101, collapsing down to code collapse button 104. Once collapsed, the user can see more of Code C within code view 101. The user also sees a closer visual relation between Code A and Code C. In order to reverse the code collapse, the user would typically select code collapse button 104, which would return the text of Code B to its original location.

The general limitation to code collapse features is that the user generally has to navigate to the specific code that he or she desires to collapse, highlight the desired code, and then select to collapse that code. While the feature provides benefit to coders, designers, and developers, it is still a tedious process to select multiple groups of code text and individually collapse each selected group.

BRIEF SUMMARY OF THE INVENTION

The present invention is directed to a content collapse feature that allows a user to designate what should be collapsed by designating a content property, such as attributes, identifications (IDs), tag classes, property relationships, and the like. In some representative embodiments, input of one or more content properties come in from a user desiring to collapse various sections of content displayed in an IDE. The content can be either code in a code view or rendered content in a design view. One or more portions of the content corresponding to the content properties is identified by the IDE and then collapsed wherein the content in the collapsed portions are removed from the IDE display. In some representative embodiments, the collapsed portions of content are replaced with a collapse indicator visible to users in the IDE display. Other representative embodiments, may collapse the designated portions of content without any visual indicator either in the code view or design view.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2B is a screenshot illustrating the IDE after the developer invokes the code collapse feature;

FIG. 5 is a flowchart illustrating example steps executed to implement another embodiment of the present invention;

FIG. 7 illustrates a computer system adapted to use embodiments of the present invention.

DETAILED DESCRIPTION OF THE INVENTION

Figure 1A:
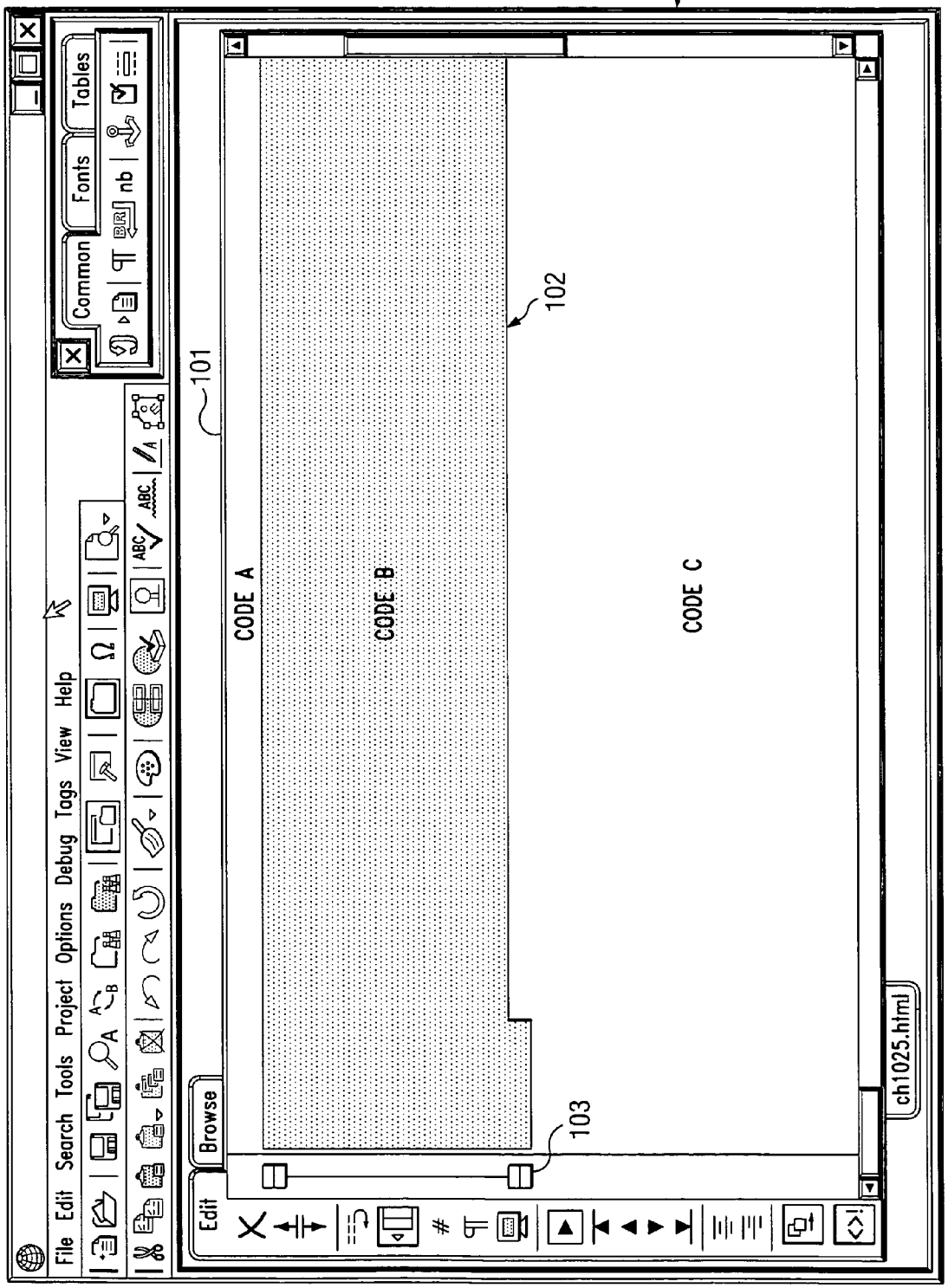
FIG. 1A is a screenshot illustrating an IDE having code view.
Figure 1B:
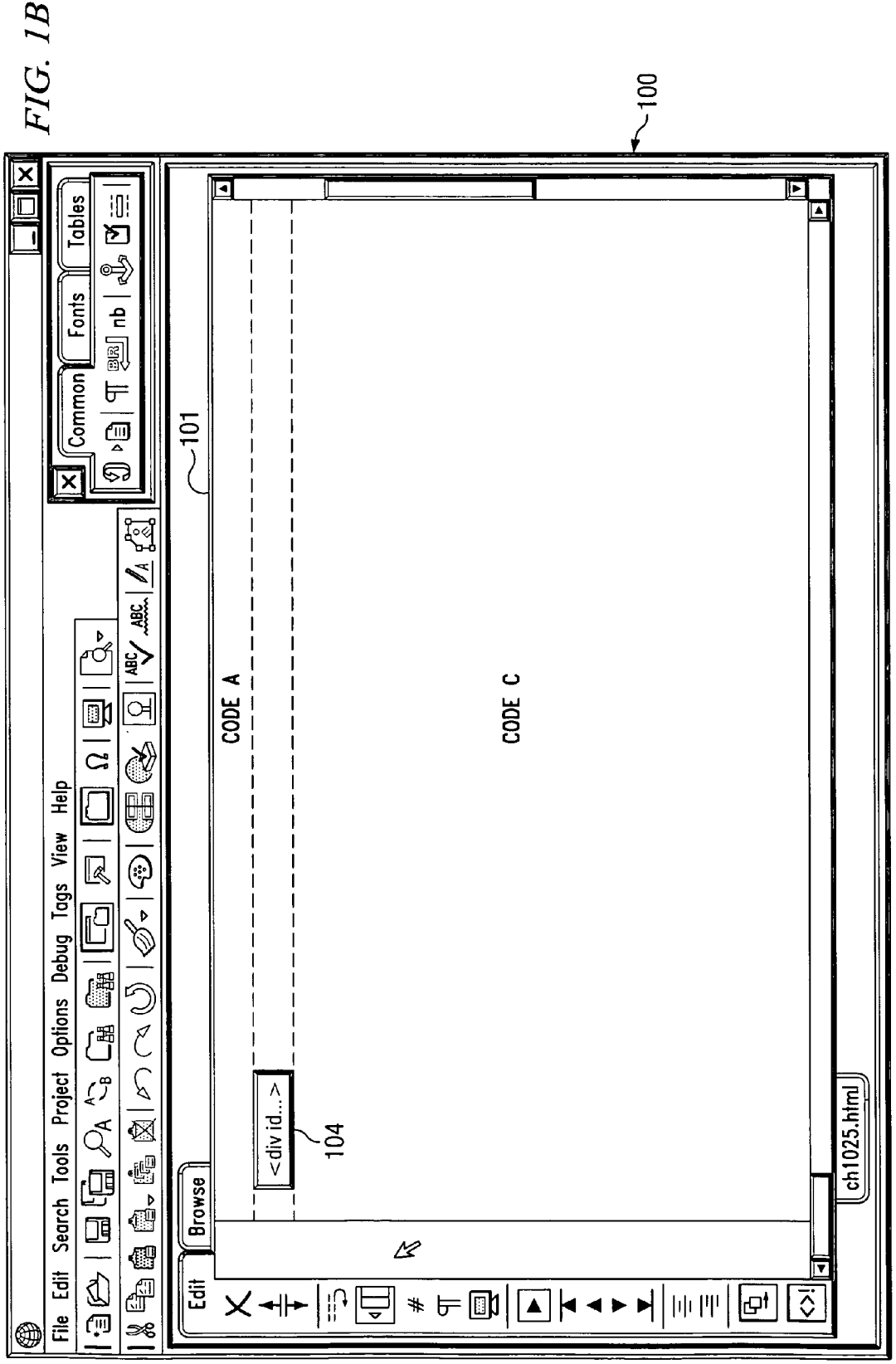
FIG. 1B is a screenshot illustrating the IDE after the user selects to collapse Code B.
Figure 2A:
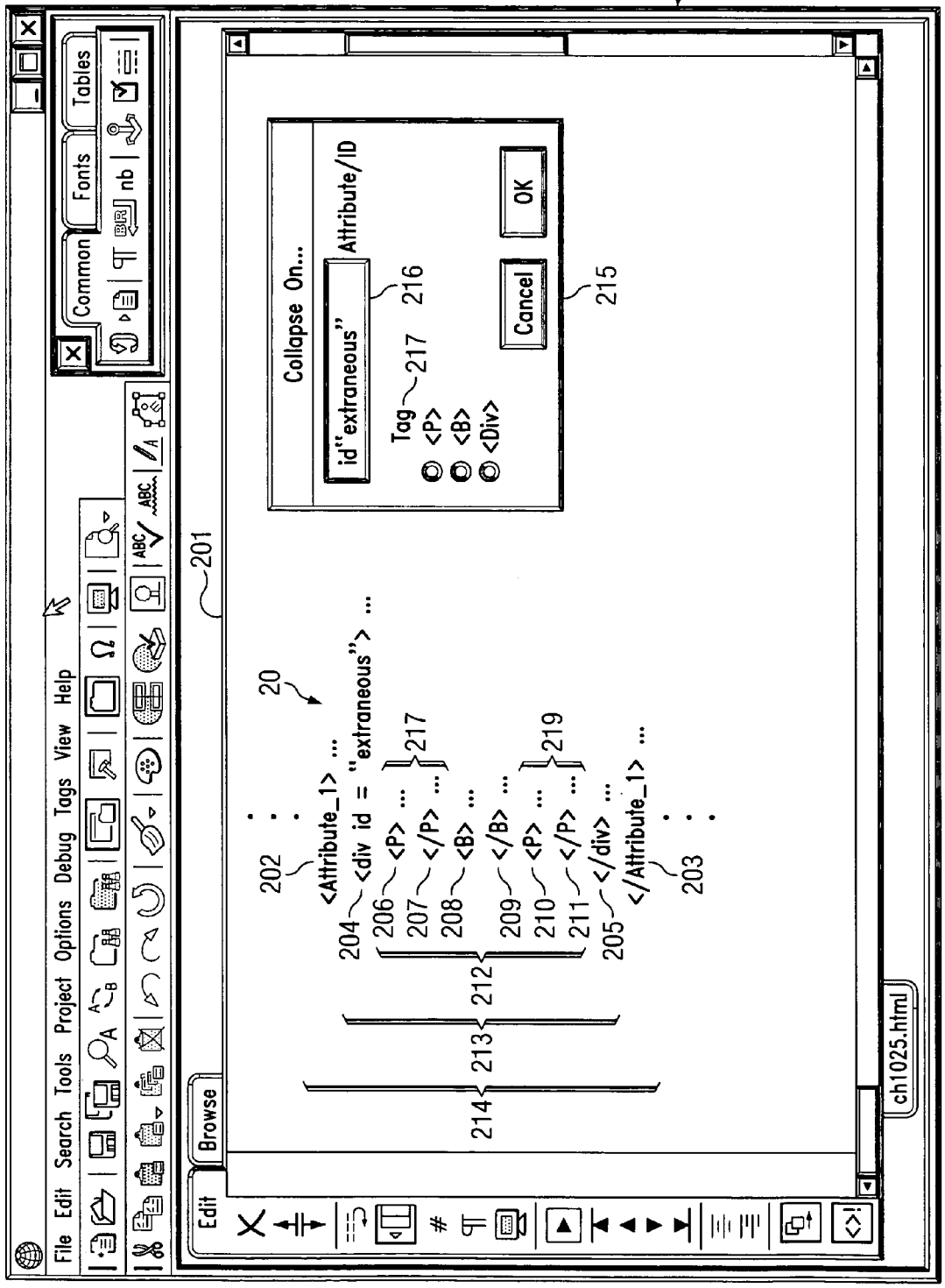
FIG. 2A is a screenshot illustrating an IDE configured according to one embodiment of the present invention.

FIG. 2A is a screenshot illustrating IDE 200 configured according to one embodiment of the present invention. IDE 200 includes code view 201 having example code 20 displayed thereon. The example representative code includes attribute tags 202 and 203, tags with identification markers, such as ID tags 204 and 205, paragraph tags 206, 207, 210, and 211, and boldface tags 208 and 209. It should be noted that the code displayed in FIG. 2A is merely representative examples of tags and partial code. In actual use, full regulation code would be present in any of a variety of languages, such as HTML, XML, Sun Microsystems, Inc.'s JAVA®, and the like, or even styled or formatted text in a word processing program or text editor, such as Microsoft Corporation's WORD®.

In designing a particular web page or Internet document, a developer may wish to view the structure of the application or possibly view different sections of code together without any intervening code. In the example illustrated in FIG. 2, the developer would like to collapse all of the formatting code, such as the code represented ID tags 204 and 205. Instead of highlighting each code section that the developer wants to collapse, IDE 200 presents a collapse on attribute feature that allows the user to designate the actual content property, such as an attribute, a specific value, a style, an ID, a tag class, a property relationship, or the like. An example property relationship would be designating to collapse all table content that is the descendant of a specific node. This property is, therefore, a relationship of that collapsed content to the specific table node. When the user desires to activate this collapse feature, he or she makes a menu selection or selects a button on the display to reveal collapse menu 215. Collapse menu 215 includes various methods for a user to select which particular content property is to be collapsed. For example, collapse menu 215 includes attribute/ID field 216 that the user may designate which attribute, attributes, ID, or IDs he or she would like to have collapsed throughout the document. Collapse menu 215 also includes tag selection area 217, which presents available tag classes to the user to select for collapsing.

By selecting various content properties, a developer can decide to collapse a large variety of sections or portions of the displayed content. For example, if the user selects to collapse all attributes, with the name, "attribute_1," IDE 200 would collapse all of the code within region 214. IDE 200 would locate attribute tags 202 and 203 and collapse all text between those tags. IDE 200 will continue searching through all of the content to find any other attribute tags that would represent "attribute_1." If any such sections of information within the content are found, IDE 200 will collapse those portions as well. Moreover, the user may desire to collapse the rendered content that the code represents. When the user selects this type of collapse, the rendered portions corresponding to attribute tags 202 and 203 would be removed from the design view.

By designating an ID with the name "extraneous," IDE 200 will look for and collapse all code within tags, such as ID tags 204 and 205. In the part of the example displayed in FIG. 2A, designating an ID of "extraneous" to collapse in attribute/ID field 216, all of the code within region 213 would be collapsed.

FIG. 2B is a screenshot illustrating IDE 200 after the developer invokes the code collapse feature. In activating the code collapse feature, the developer interacted with collapse menu 215 (FIG. 2A) selecting to collapse all IDs labeled "extraneous." Once his or her interaction is completed, the code within region 213 (FIG. 2A) is collapsed. IDE 200 examines the displayed content, locates the beginning ID tag 204 and ending ID tag 205 and collapses all of the code between those tags. To collapse the code, IDE 200 removes all of the text, script, or code from its display and replaces it with collapse indicator 220. Collapse indicator 220 represents the code that is between ID tags 204 and 205. With collapse indicator 220 in place of the code, the developer is able to get a better view of the structure of the code of the document. Moreover, the developer was able to collapse all code of a particular attribute by specifying the property or property value, instead of highlighting the sections of each desired portion and manually clicking the collapse selection button of IDE 200. Additionally, by collapsing selections of code, the developer can implement a short-cut technique that saves time in page scrolling, mouse clicks, mouse movements, and the like, which can greatly increase productivity and can provide a better or faster developer experience.

Figure 3:
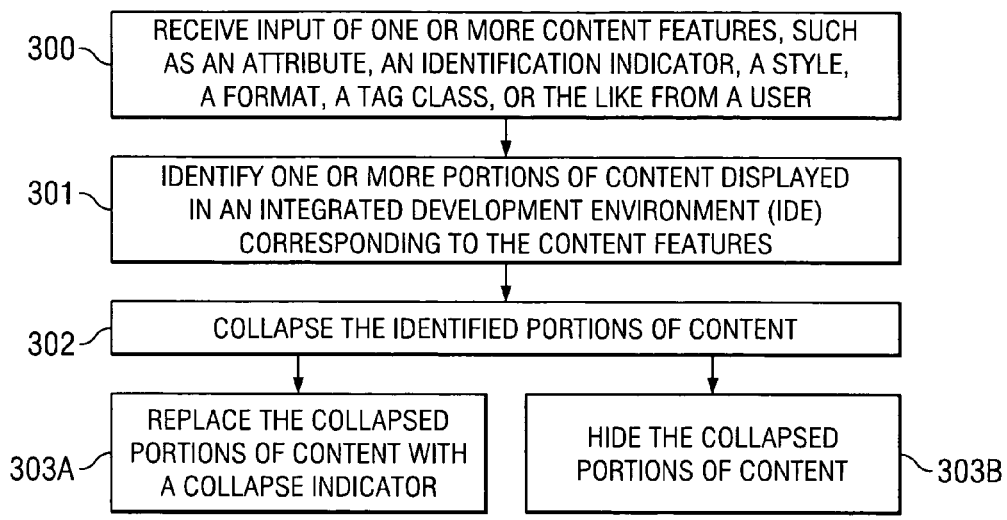
FIG. 3 is a flowchart illustrating example steps executed to implement one embodiment of the present invention.

FIG. 3 is a flowchart illustrating example steps executed to implement one embodiment of the present invention. In step 300, input of one or more content properties, such as an attribute, a style, a format, an identification indicator, a tag class, or the like, is received from a user. In step 301, identify one or more portions of content displayed in an integrated development environment (IDE) corresponding to the content properties. Collapse the identified portions of content in step 302. Depending on the embodiment represented, the collapsed portions of content are replaced, in step 303A, with a collapse indicator. Alternatively, in additional or alternative embodiments, the collapsed portions of content are hidden from view in step 303B.

It should be noted that some IDEs generate or receive structural representations of the actual content, such as in a document object model (DOM), document type definition (DTD), schema, or other types of content models. When implementing various additional and alternative embodiments of the present invention in IDEs that use content models, the IDE may search for the corresponding text, code, or content using the content model.

Figure 4:
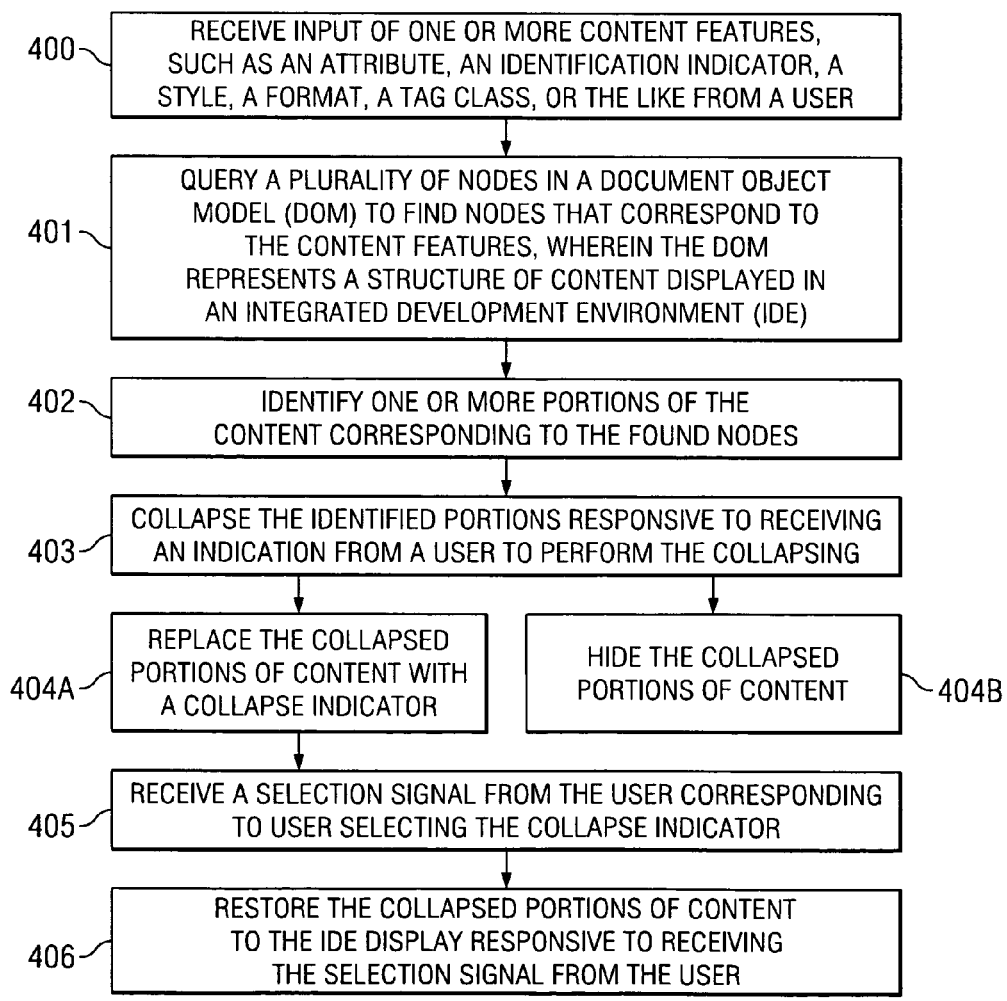
FIG. 4 is a flowchart illustrating example steps executed to implement another embodiment of the present invention.

FIG. 4 is a flowchart illustrating example steps executed to implement another embodiment of the present invention. In step 400, input of one or more content properties, such as an attribute, a style, a format, an identification indicator, a tag class, or the like is received from a user. A plurality of nodes in a document object model (DOM) are queried, in step 401, to find nodes that correspond to the content properties, wherein the DOM represents a structure of content displayed in an integrated development environment (IDE). In step 402, one or more portions of the content corresponding to the found nodes are identified. The identified portions of content are collapsed, in step 403, responsive to receiving an indication from a user to perform the collapsing. In select embodiments, each of the collapsed portions of content is then replaced, in step 404A, with a collapse indicator. In additional and/or alternative embodiments of the present invention, each of the collapsed portions of content is hidden from view in step 404B. If the user desires to restore the collapsed portions that are replaced with collapse indicators in step 404A, he or she would select the collapse indicator. In such case, a selection signal is received, in step 405, from the user corresponding to user selecting the collapse indicator. In step 406, the collapsed portions of content is then restored to the IDE display responsive to receiving the selection signal from the user.

It should be noted that while FIG. 4 used an example of a DOM content model, the various embodiments of the present invention are not limited to only operating with DOMs. The use of any other type of content model may be beneficial.

It should further be noted that some IDEs represent text, code, or other content, as plain text. When implementing the various additional and alternative embodiments of the present invention in IDEs that use text representation, the IDE may search for the corresponding text, code, or content to be collapsed by directly searching the text of the content.

FIG. 5 is a flowchart illustrating example steps executed to implement another embodiment of the present invention. In step 500, input of one or more content properties, such as an attribute, a style, a format, an identification indicator, a tag class, or the like, is received from a user. Content displayed in an integrated development environment (IDE) is searched, in step 501, for information or content entries matching the content properties. A section of content associated or grouped with each of the information or content entries matching the content properties is identified in step 502. The identified sections are collapsed, in step 503, responsive to receiving an indication from a user to perform the collapsing. In select embodiments, each of the collapsed sections is replaced, in step 504A, with a related collapse indicator. In additional and/or alternative embodiments of the present invention, the collapsed sections are simply hidden from view in step 504B. If the user desires to restore the collapsed portions that have been replaced by collapse indicators in step 504A, he or she would select the collapse indicator. In such case, a selection signal is received, in step 505, from a user corresponding to user selecting one of the collapse indicators. Display of the sections of content in the IDE is restored, in step 506, responsive to receiving the selection signal from the user.

Figure 6:
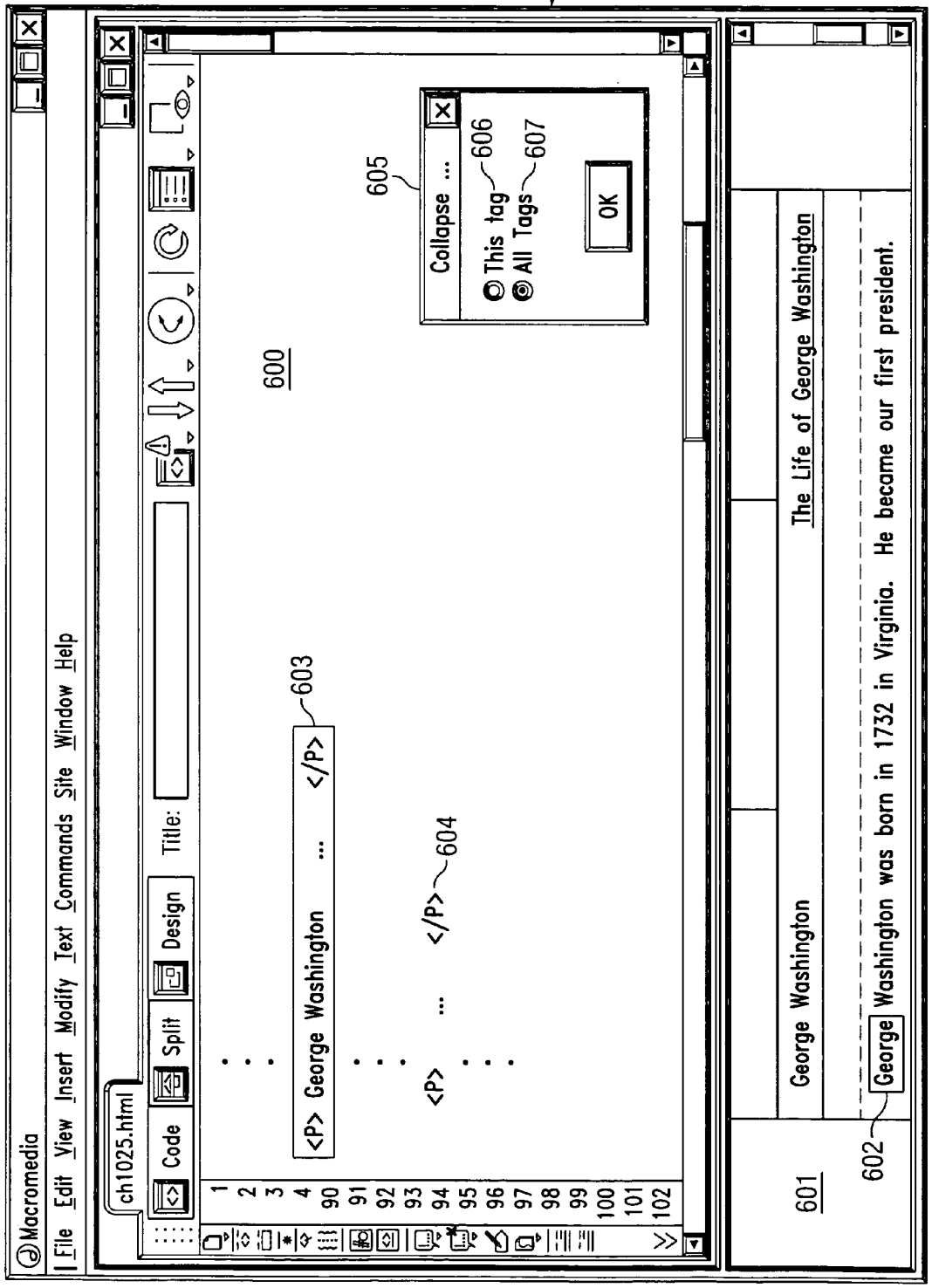
FIG. 6 is a screenshot illustrating an IDE configured according to one embodiment of the present invention.

FIG. 6 is a screen shot illustrating IDE 60 configured according to one embodiment of the present invention. In addition to designating the attributes, tags, IDs, and the like from with code views, IDE 60 provides for designating the collapsing feature from within design views, such as design view 601. Design view 601 provides the rendered graphical appearance of the code displayed in code view 600. IDE 60 allows a developer to design applications in either or both of code view 600 or design view 601. In selecting attributes for collapse, the developer may select the representative attribute object from within design view 601. For example, the developer may select the first word of the sentence, "George" which would select the <p> tag and corresponding "George" text in the code view at code line 603. To activate the collapse feature, the user selects an entry method, such as through a pull-down menu, short-cut, button, or through a right-click of the pointing device. Upon selection, collapse dialog 605 provides options for the developer's collapse decisions. The developer may select to either collapse only the tag that is selected, by selecting This Tag option 606, or may select to collapse all of the <p> tags in the document, by selecting All Tags option 607. In the illustrated example, the developer has selected All Tags option 607. Once this is chosen, all of the text or code within all of the <p> tags in code view 600 will be collapsed. This collapsed text or code allows the user to more easily navigate the code and view its overall structure.

The program or code segments making up the various embodiments of the present invention may be stored in a non-transitory computer readable medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, and the like. A computer data signal can be used to transfer code segments, and may include any signal that can propagate over a transmission medium such as electronic network channels, optical fibers, air, electromagnetic, RF links, and the like. The code segments may be downloaded via computer networks such as the Internet, Intranet, and the like.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, and the like, to the computer system 700. The display card 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   accessing at least one file comprising code of an application;
   generating a content model representing a structure of the code, the content model comprising a plurality of nodes;
   displaying a textual view of the code;
   receiving input defining one or more content properties;
   after receiving input of the one or more content properties, identifying at least one portion of the code for removal from the displayed textual view by querying the content model, the identified portion comprising at least one of:
   code corresponding to a node having a property that matches the content property as defined by the input, code corresponding to a node that is associated with or grouped with the node having a property matching the content property, or code corresponding to a node to which the defined property is applied; and
   collapsing said one or more identified portions by removing the one or more identified portions from the displayed textual view.

2. The method of claim 1 further comprising:
   replacing said collapsed one or more identified portions with a collapse indicator.

3. The method of claim 2 further comprising: receiving a selection signal indicating selection of said collapse indicator; and
   responsive to receiving said selection signal, restoring display of said one or more collapsed portions.

4. The method of claim 1 wherein said content model comprises one of:
   a document object model (DOM);
   a document type definition (DTD); and
   a schema.

5. The method of claim 1 wherein said content property comprises one or more of: an attribute; a specific value; a style; a format; a relationship; an identification indicator; and a tag class.

6. The method of claim 1 further comprising:
   displaying a design view, the design view comprising a graphical element defined by the code,
   wherein the input defining the one or more content properties comprises selection of said graphical element from the design view.

7. A method comprising:
   displaying a text view depicting code, the code defining application content;
   receiving input designating one or more content properties for collapse;
   accessing a content model of the application content, the content model generated from the code and comprising nodes corresponding to respective sections of the code;
   querying the model to identify at least one node of the content model corresponding to the designated one or more content properties;
   identifying at least one section of the code corresponding to the identified at least one node; and
   removing said identified at least one section of code from the displayed text view.

8. The method of claim 7 further comprising:
   replacing each of said removed section of code with a collapse icon.

9. The method of claim 8 further comprising:
   detecting selection of said collapse icon; and
   restoring one of said removed sections of text corresponding to said selected collapse icon.

10. The method of claim 7 wherein said content model comprises one of:
    a document object model (DOM);
    a document type definition (DTD); and
    a schema.

11. The method of claim 7 wherein said one or more content properties comprises one or more of: an attribute; a specific value; a style; a format; a relationship; an identification indicator; and a tag class.

12. The method of claim 7, further comprising:
    displaying a design view, the design view comprising a graphical element defined by the code,
    wherein said input comprises selection of the graphical element displayed in the design view.

13. A computer program product having a non-transitory computer readable medium embodying program code executable by a computing system, said computer program product comprising:
    program code that configures the computing system to access at least one file defining code of an application and to provide output to display a textual view of the defined code;
    program code that configures the computing system to generate a content model of the code, the content model comprising a plurality of nodes;
    program code that configures the computing system to receive input defining a content property;
    program code that configures the computing system to query the content model, after receiving the input, for at least one node corresponding to said content property;
    program code that configures the computing system to identify one or more sections of code corresponding to the at least one node; and
    program code that configures the computing system to remove one or more identified sections of code from said textual view.

14. The computer program product of claim 13 further comprising program code that configures the computing system to replace said removed one or more sections with at least one collapse indicator.

15. The computer program product of claim 14 further comprising: program code that configures the computing system to restore at least one of said one or more removed sections in response to selection of a collapse indicator.

16. The computer program product of claim 13 wherein said content model comprises
    a document object model (DOM).

17. The computer program product of claim 13 wherein said content property
    comprises one or more of: an attribute; a specific value; a style; a format; a relationship; an identification indicator; and a tag class.

18. The computer program product of claim 13 further comprising:
    program code that configures the computing system to provide an interface for receiving a selection of the property from a list of properties,
    wherein at least said code that configures the computing system to remove causes the computing system to act in response to said selection.

19. The computer program product of claim 13 further comprising:
   program code that configures the computing system to render a design view, the design view including a graphical element defined by the code of the application; and
   program code that configures the computing system to detect selection of said content property from the design view.

20. A computing system comprising:
   a processor; and
   a memory,
   wherein the memory embodies one or more program components of a development application that configures the computing system to:
   access at least one file comprising code of an application;
   render a textual view of the accessed code to be output using a display device, the textual view showing a plurality of sections of the code;
   generate a content model representing the code, the content model comprising a plurality of nodes;
   receive input identifying a content property;
   after the input is received, define at least one section of code to be removed from the textual view by searching the content model for at least one node corresponding to the content property as identified in the input, the at least one section of code defined as a portion or portions of the code that include:
      code corresponding to a node having a property that matches the content property as identified in the input, and
      code corresponding to a node associated with or grouped with the node having a property that matches the content property; and
   after the at least one section of code is defined, remove the defined at least one section of code from the textual view.

21. The system set forth in claim 20, wherein the one or more program components of the development application configure the computing system to search in the same way for the content property regardless of whether the content property is an attribute, a specific value, a style, a format, a relationship, an identification indicator, or a tag class.

22. The system set forth in claim 20, wherein the content property used in defining the at least one section of code to be removed is undefined prior to receiving the input identifying the content property.

23. The system set forth in claim 20, wherein the model is a document object model and the defined at least one section to be removed comprises code corresponding to a node of the document object model having a property matching the content property as defined in the input.

24. The system set forth in claim 20, wherein the model is a document type definition.

25. The system set forth in claim 20, wherein the model is a schema.

26. The system set forth in claim 20, wherein the one or more program components of the development application further configure the computing system to:
   during or after removing the defined at least one section of code from view, replace the defined at least one section of code with a collapse icon.

* * * * *